(12) United States Patent
Dangi et al.

(10) Patent No.: US 12,443,491 B2
(45) Date of Patent: Oct. 14, 2025

(54) COMMUNICATING AND TAKING ACTION BASED ON CONTEXTS FOR MESSAGES BETWEEN USERS IN COPY MANAGEMENT SYSTEMS

(71) Applicant: Dell Products L.P., Round Rock, TX (US)

(72) Inventors: Salil Dangi, Mission Viejo, CA (US); Nitin Madan, Cupertino, CA (US)

(73) Assignee: Dell Products L.P., Round Rock, TX (US)

( * ) Notice: Subject to any disclaimer, the term of this patent is extended or adjusted under 35 U.S.C. 154(b) by 202 days.

(21) Appl. No.: 18/495,098

(22) Filed: Oct. 26, 2023

(65) Prior Publication Data

US 2024/0362125 A1    Oct. 31, 2024

Related U.S. Application Data

(63) Continuation-in-part of application No. 18/309,363, filed on Apr. 28, 2023, now Pat. No. 11,829,708.

(51) Int. Cl.
*G06F 11/14* (2006.01)

(52) U.S. Cl.
CPC ...... *G06F 11/1464* (2013.01); *G06F 11/1451* (2013.01); *G06F 2201/84* (2013.01)

(58) Field of Classification Search
CPC .... G06F 40/134; G06F 16/128; G06F 11/327; G06F 11/1458; G06F 11/1469; G06F 40/166; G06F 11/1451; G06F 11/1464; G06F 2201/84; G06F 40/30
See application file for complete search history.

(56) References Cited

U.S. PATENT DOCUMENTS

| | | | | |
|---|---|---|---|---|
| 7,450,908 | B1* | 11/2008 | Bilder | H04L 41/5032 379/22 |
| 12,335,215 | B1* | 6/2025 | Sundar | H04L 51/046 |
| 2015/0372829 | A1* | 12/2015 | Joshi | G06F 3/0485 709/204 |
| 2020/0142946 | A1* | 5/2020 | Rakhimov | G06F 16/9577 |
| 2021/0311838 | A1* | 10/2021 | Hughes | G06F 11/3495 |

\* cited by examiner

*Primary Examiner* — Asher D Kells
(74) *Attorney, Agent, or Firm* — Dergosits & Noah LLP; Todd A. Noah

(57) ABSTRACT

System determines first context of messages between copy management system users and creates snapshot of copy management content part, which is displayed by user interface, and selected by system user as context for subsequent message. System creates hyperlink in message to snapshot that depicts copy management content part and stores user entries for tag that identifies at least one intended recipient of message, time when message is available for intended recipient(s), and text for message. System sends message at time to intended recipient(s) via internal communication channel of system. In response to recipient of message selecting message's hyperlink to snapshot, system outputs context for message to recipient's user interface, which enables recipient to respond to message. If second context of messages between copy management system users matches first context of messages, then information requested in message after first context of messages is conveyed to at least one user interface.

20 Claims, 7 Drawing Sheets

| PowerProtect Data Manager | | | | | | |
|---|---|---|---|---|---|---|
| Dashboard | Protection Jobs | | | | | |
| Health | Start Time  All Jobs | | | | | |
| Infrastructure | | | | | | |
| Protection | 401 Jobs Failed   141 Jobs Completed with Exceptions   5309 Job Success | | | | | |
| Restore | | | | | | |
| Alerts | Restart  Export Log  Cancel  Export All  Search ____ | | | | | |
| Administration | | | | | | |
| Reports | | | | | | |
| Jobs | Job ID | Status | Description | Policy name | Assets | Job type |
| Protection Jobs | 5517226C | Success | Protecting SQL Databases SQL_PLC-1 Protection -Log | SQL_PLC-1 | 500 | Protect |
| Asset Jobs | 72D4C65A | Success | Protecting SQL Databases SQL_PLC-2 Protection -Log | SQL_PLC-2 | 503 | Protect |
| System Jobs | D28AB5B1 | Success | Protecting SQL Databases AAG SQL_PLC Protection-Log | AAG SQL_PLC | 200 | Protect |
| | CE11542D | Success | Protecting SQL Databases AAG SQL_PLC Protection-Differential | AAG SQL_PLC | 200 | Protect |
| | DAD2D975 | Completed/w Exceptions | Protecting SQL Databases SQL_PLC-2 Protection-Differential | SQL_PLC-2 | 503 | Protect |
| | 3DAE883D | Failed | Protecting File System FS-FBB Windows Protection -Synthetic | FS-FBB Windows | 75 | Protect |
| | 5DCF71D7 | In Progress | Protecting SQL Databases AAG SQL_PLC Protection-Log | AAG SQL_PLC | 200 | Protect |

FIG. 3

COMMUNICATING AND TAKING ACTION BASED ON CONTEXTS FOR MESSAGES BETWEEN USERS IN COPY MANAGEMENT SYSTEMS

CROSS-REFERENCE TO RELATED APPLICATION

This application is a continuation-in-part of U.S. application Ser. No. 18/309,363, filed Apr. 28, 2023, hereby incorporated by reference in its entirety and for all purposes.

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup/restore application to execute a restore operation to restore a copy of the corresponding backup file(s) for that previous state to the data object.

FIG. 1 illustrates a diagram of an example copy management system 100 in which client devices 102 and 104 execute respective backup/restore applications 106 and 108, which may be copy management applications 106 and 108, such as Dell's PowerProtect Data Domain, to create backup files for data objects, which are generated by respective enterprise applications 110 and 112. The copy management system 100 can store the backup files on a primary data storage platform 114, such as a primary data domain system, which then can replicate the backup files to a secured data storage platform 116, such as a disaster recovery data domain system. Such a copy management system 100 and its backup administrators can manage thousands of digital assets and tens of thousands of backup and restore jobs that protect these assets.

These jobs can include setting and monitoring backup and disaster recovery policies. In most cases, backup copies are managed by exception. If a copy management system 100 reports a backup failure, or if some other backup job is taking an inordinately long time to complete a copy of the data for the enterprise application 110, a backup administrator may respond by continuing to monitor the enterprise application 110 and/or a backup job. For large organizations, backup and restore services require multiple backup administrators who can work across time zones or shifts to make sure that the backups are kept in accordance with service level agreements.

BRIEF DESCRIPTION OF THE DRAWINGS

FIG. 3 illustrates a block diagram of an example protection jobs report for a natural language processor communicating and taking action based on contexts for messages between users in copy management systems, under an embodiment;

DETAILED DESCRIPTION

Figure 1:
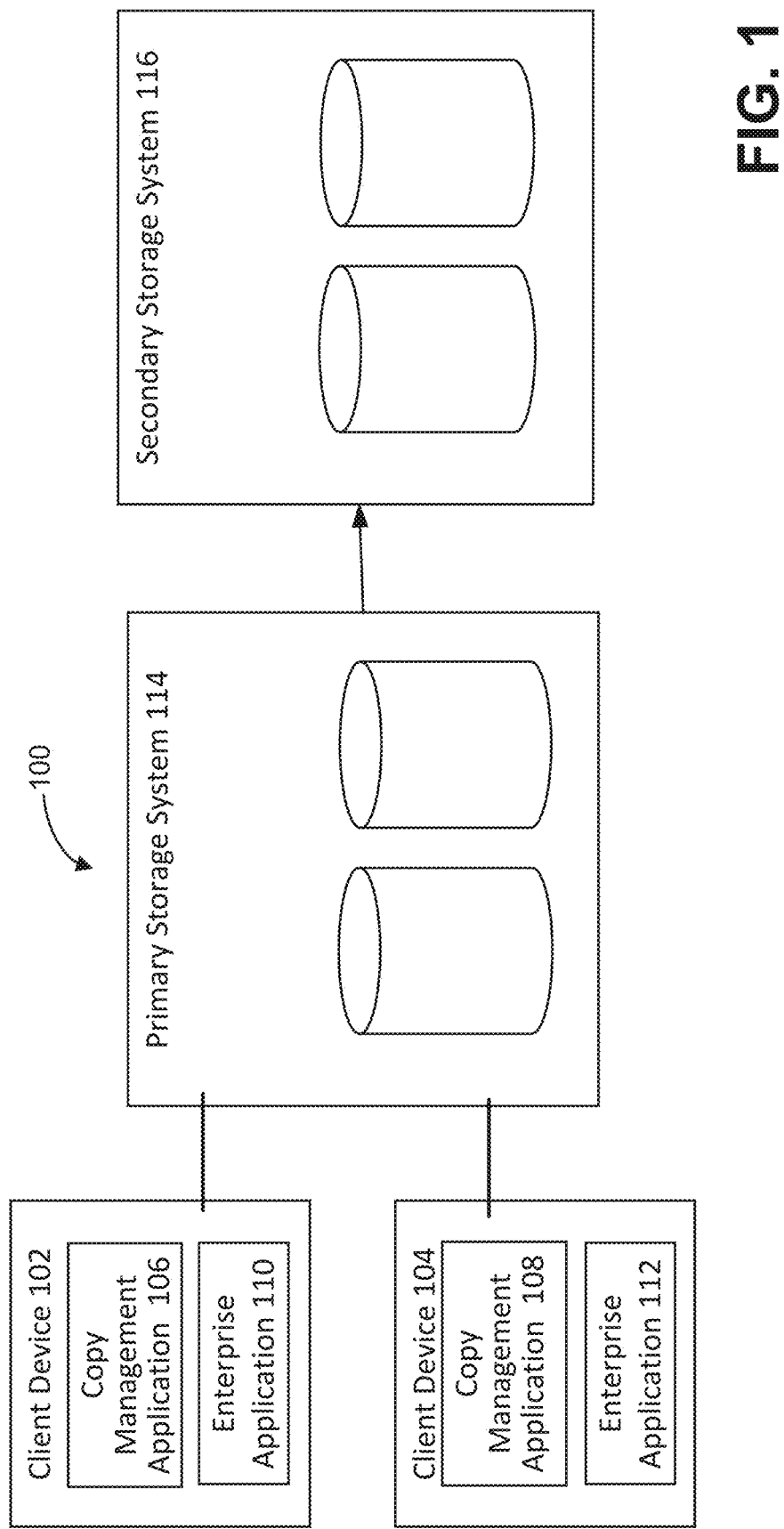
FIG. 1 illustrates a block diagram of an example copy management system which includes a primary storage data platform and a secondary storage data platform.

Embodiments herein disclose a natural language processor communicating and taking action based on contexts for messages between users in copy management systems. A copy management system determines a context of messages between users of the copy management system. The copy management system creates a snapshot of a part of copy management content which is displayed by a user interface, and which is selected by a user of the copy management system as context for a message from the user. The copy management system creates a hyperlink in the message to the snapshot which depicts the identified part of the copy management content. The copy management system stores user entries for a tag that identifies an intended recipient(s) of the message, a time when the message is made available for the intended recipient(s), and text for the message. The copy management system sends the message at the time to the intended recipient(s) via an internal communication channel of the copy management system. In response to a selection of a hyperlink to the snapshot, in the message, by the intended recipient(s) of the message, the copy management system outputs the context for the message to at least one user interface associated with the intended recipient(s), which enables the intended recipient(s) to respond to the message. If the current context of messages between users of the copy management system matches the previous context of messages between users of the copy management system, then the copy management system conveys, to at least one user interface, information requested in a message subsequent to the previous context of messages.

For example, a copy management system determines that Dana, an Acme Corporation backup administrator, requested Ed, another Acme Corporation backup administrator, to restore a file from a virtual machine backup file X which was backed up from an ESX hypervisor's host server Y, after which Ed requested clarifications about the lab location of the host server Y, and whether the active directory credentials can enable Ed to perform the requested restore operation. Then the copy management system responds to a system user Amy selecting a row of information about a protection job from a user interface's detailed protection jobs page by opening a modal window that automatically captures a snapshot depicting the row as a specific context for a message about the job, and creates a hyperlink to the snapshot in the message. The copy management system creates an actionable message by recording Amy's free flow text, "Restart this backup job," her tagging of a system user Bob as an intended recipient of the message, and one hour after Bob's shift begins when the actionable message pops up for Bob. The copy management system directly communicates Amy's message, which includes a hyperlink to the row which depicts the specific context of the failed job, within the copy management system's internal communication channel to the tagged user Bob. When Bob selects the hyperlink in the message, the copy management system displays the row in the detailed jobs page as the automatically captured context of the protection job that failed, which enables Bob to understand the specific context of the failed protection job and therefore take the appropriate corrective action. The machine learning system learned that the previous series of messages between Dana and Ed included Dana requesting for Ed to restore a file, which was followed by Ed requesting for clarification of a lab location where the file will be restored and whether the active directory credentials can enable Ed to perform the requested restore operation. Therefore, upon recognizing a familiar context when Amy requested Bob to restore a file, the machine learning system auto-prompted Amy to answer the inevitably required clarifications about the lab location and the credentials.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Although these embodiments are described in sufficient detail to enable one skilled in the art to practice the disclosed embodiments, it is understood that these examples are not limiting, such that other embodiments may be used, and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment may be included in at least one embodiment of the disclosure. The appearances of the phrase "embodiment" in various places in the specification do not necessarily all refer to the same embodiment.

Figure 2:
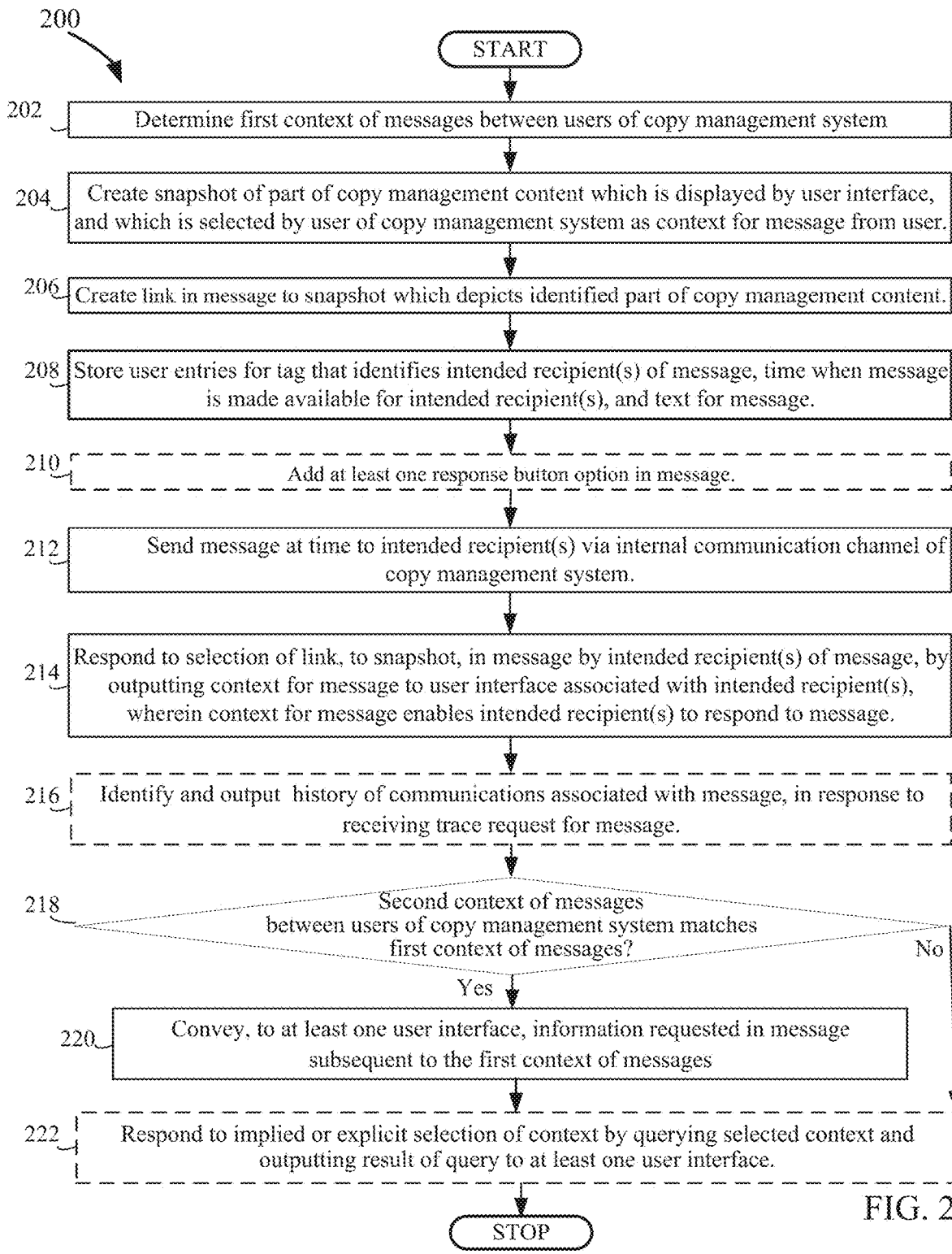
FIG. 2 is a flowchart that illustrates an example method for a natural language processor communicating and taking action based on contexts for messages between users in copy management systems, under an embodiment.

FIG. 2 is a flowchart 200 that illustrates a method for a natural language processor communicating and taking action based on contexts for messages between users in copy management systems, in an embodiment. Flowchart 200 depicts method acts illustrated as flowchart blocks for certain steps involving the client devices 102 and 104, the primary data storage platform 114, and/or the secondary data storage platform 116 of FIG. 1. The description below of the blocks 200-222 in the flowchart 200 includes references to the example protection jobs report 300 depicted by FIG. 3, the example action requested message 400 depicted by FIG. 4, the example received message 500 depicted by FIG. 5, the example self-directed message 600 depicted by FIG. 6, the example informational message 700 depicted by FIG. 7, and the example dashboard for protection jobs 800 depicted by FIG. 8. FIG. 3 illustrates a block diagram of the example protection jobs report 300 for a natural language processor communicating and taking action based on context for messages between users in copy management systems under an embodiment. The example protection jobs report 300 includes a row 304 for a protect job that failed.

A copy management system determines a first context of messages between users of the copy management system, block 202. The system identifies conversational contexts between users which may be identified again in the future as similar or matching conversational contexts. In embodiments, this can include a copy management system identifying the content of multiple messages between Dana, a backup administrator who works Acme Corporation's third shift of the day from 4:00 P.M. to midnight, and Ed, Acme corporation's backup administrator who works the first weekend shift after Dana's Friday night shift. The copy management system's natural language processing engine analyzes the content and determines that Dana requested Ed to restore a file from a virtual machine backup file X which was backed up from an ESX hypervisor's host server Y.

A copy management system can be a group of related hardware units or programs or both, which have the responsibility for and control of backups of data. A context can be the circumstances that form the setting for an event, in terms of which the event can be fully understood and assessed. A message can be information which is sent by a sender to a recipient. A user can be a person who uses or operates a computer.

Ed acknowledged Dana's request to restore the file and responded with a message that requested Dana to clarify the lab location for the ESX hypervisor's host server Y. After Dana responded to Ed's request for a lab location clarification by sending a message that identifies the lab location for the ESX hypervisor's host server Y, Ed acknowledged Dana's lab location clarification, and then responded with a message that requested clarification about whether the active directory credentials can enable Ed to perform the requested restore operation. After Dana responded to Ed's request for a credentials clarification by sending a message that confirms that the active directory credentials can enable the requested restore operation, Ed acknowledged Dana's credentials clarification and used the active directory credentials to restore the file from the virtual machine backup file X to the ESX hypervisor's host server Y in the correct lab location. The copy management system's machine-learning system learns that when a series of messages between users creates the content that becomes the conversational context for requesting to restore a file, the additional context that is subsequently requested is the lab location that will be the target for the restored file, and the credentials for performing the restore operation. Consequently, upon identifying a future conversational context for restoring a file, the machine-learning system can expedite the exchange of information and messages by automatically conveying the requests for clarifications.

After the machine-learning system learns about conversational contexts of user messages and any subsequent clarifications requested for such contexts, a snapshot is created of a part of copy management content which is displayed by a user interface, and which is selected by a user of a copy management system as context for a message from the user, block 204. The system creates a live snapshot of a part of the displayed copy management information which is selected by a user as context for a subsequent message from the user. For example, and without limitation, this can include a copy management system displaying the protection jobs report 300 that lists information about recent protection jobs, which include snapshots taken by Amy, the backup administrator who works Acme Corporation's first shift of the day from midnight to 8:00 A.M., for her upcoming message(s).

A snapshot can be a captured image which includes information and which is displayed by a computer. A part can be a piece or segment of something such as an object, which combined with other pieces makes up the whole. Copy management content can be information which is made available by a website or other electronic medium, and which describes the responsibility for and control of backups of data. A user interface can be the point of human-computer interaction and communication in a device, including display screens, keyboards, and a mouse.

The protection jobs report 300 includes the row 302 of information for the job ID 5DCF71D7, which has a job status of in-progress, the row 304 of information for the job ID 3DAE883D, which has a job status of failed, and the row 306 of information for the job ID DAD2D975, which has a job status of completed with exceptions. Amy can right-click on the row 302 of information for the job ID 5DCF71D7 to create a live snapshot of the row 302 as the context for a message that Amy will send about monitoring execution of a backup job that may fail. Amy can also right-click on the row 304 of information for the job ID 3DAE883D to create a live snapshot of the row 304 as the context for a message that Amy will send about restarting a backup job that may fail again. Amy can similarly right-click on the row 306 of information for the job ID DAD2D975 to create a live snapshot of the row 306 as the additional context for either of the two other messages that Amy will send about monitoring execution of a backup job that may fail and restarting a backup job that may fail again.

The row 306 provides additional information about the job in the row 302 and/or the job in the row 304, because the problems began with the backup job described in the row 306 after the first four backup jobs in the protection jobs report 300 executed successfully. The row 306 indicates that the backup job with the job ID DAD2D975 encountered problems executing completely with exceptions, which are problems that may have had a rippled effect on the execution of the next job described in the row 304 of information for the job ID 3DAE883D, which has a job status of failed, and which may have had a rippled effect on the execution of the following job described in the row 302 of information for the job ID 3DAE883D, which has a job status of in progress.

Although these examples describe a system user named Amy right-clicking on a row to create a snapshot for each of the rows as the context for Amy's subsequent messages, a system user can create a snapshot of copy management content in various ways. For example, Amy can right-click on the row 302, which depicts information about the backup job that is in progress, then right-click on the preceding row 304, which depicts information about a backup job which failed, then right-click on the previous row 306, which depicts information about a backup job which completed with exceptions, to create a live snapshot of the rows 302, 304, and 306 as the context for her subsequent messages, as depicted by FIG. 3. Additionally, Amy can right-click on the screen location 308 which is above the upper left corner of the row 306, then drag her cursor to the screen location 310 which is in the bottom right corner of the last row in the protection jobs list, and the copy management system can draw a box based on the x-y coordinates of the locations 308 and 310, and use the box encompassing the last three rows in the protection jobs report 300 to create a live snapshot of these three rows. It will be appreciated by those skilled in the art that other types of selections are possible for creating snapshots of parts of copy management content as the context of a subsequent message.

A live snapshot, in contrast to a typical snapshot of static information, may include an active hyperlink to copy management content, which corresponds to an active hyperlink in the selected part of the copy management content, such as the row 302, the row 304, or the row 306. Therefore, if the selected part of the copy management content, such as the row 302, the row 304, or the row 306, includes any hyperlinks to additional copy management content, then selecting a hyperlink to the part of the copy management content, such as the row 302, the row 304, or the row 306, also enables the selection of any hyperlinks in the part of the copy management content to additional copy management content.

The copy management system can explicitly enable multiple recipients to receive a message or a notification of the message. This process of notifying multiple recipients may be achieved via tagging, such as @Bob, @Chris, @Dana. All recipients can receive the notification of a pending message at the same time and any recipient can act on it. Such a notification can also be achieved via @shift2_admins where a message will be delivered to all administrators of the shift2 and the membership can be dynamically based on who is in shift2 at the trigger time.

Figure 4:
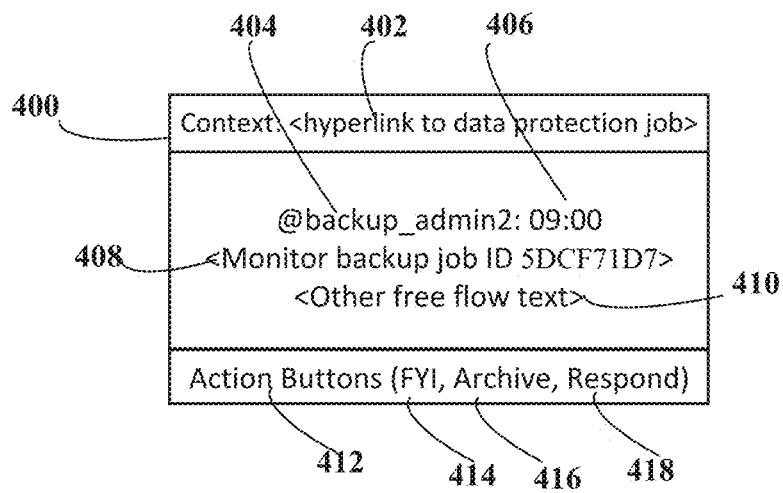
FIG. 4 illustrates a block diagram of an example action requested message for a natural language processor communicating and taking action based on contexts for messages between users in copy management systems, under an embodiment.

After a snapshot is created of a part of the copy management content, which is displayed by a user interface, a hyperlink is created in the message to the snapshot which depicts the part of the copy management content, block 206. The system creates a hyperlink in a message to a snapshot which depicts a part of copy management content that a user selected as the context for a message from the user. By way of example and without limitation, this can include a copy management system responding to Acme's first shift backup administrator Amy creating a live snapshot of the row 302 that depicts information about the in-progress protection job ID 5DCF71D7, by creating a hyperlink to the live snapshot of the row 302 which Amy selected, and which Amy can review by clicking on the hyperlink to the context 402 in Amy's message 400, as depicted by FIG. 4. Similarly, the content management system can respond to Amy creating a live snapshot of the row 304 that depicts information about the failed backup job ID 3DAE883D, by creating a hyperlink to the live snapshot of the row 304 which Amy selected, and which Amy can review by clicking on the hyperlink to the context 506 in Amy's message 500, as depicted by FIG.

5. A hyperlink can be a digital reference to a computer's information that a user can follow or be guided to by clicking or tapping.

Following the creation of a hyperlink to a snapshot which depicts the context for a subsequent message from a user, user entries are stored for a tag that identifies at least one intended recipient of the message, a time when the message is made available for the intended recipient(s), and text for the message, block 208. The system creates a message from a user to the message's at least one intended recipient(s). In embodiments, this can include a copy management system storing Amy's entry of the tag "backup_admin2" 404, which identifies Bob as the intended recipient of Amy's message as an Acme corporation's backup administrator who works the second shift after Amy's first shift, as depicted by FIG. 4. A tag inherits the object sensitivity of the corresponding user, such that if the tags are designated for a specific backup administrator or a specific group of backup administrators, such as Bob's supervisors, the tags will be visible only to that specific backup administrator, or when tagged for a specific group of users, only to the users in that group. A user with a lower privilege level will not be able to see the tagged content.

A user entry can be an item written or submitted by a person who operates a computer. A tag can be a label attached to someone or something for the purpose of identification or to provide other information. An intended recipient can be a person who is planned to be given something. A time can be a chronological point as measured in hours and minutes past midnight or noon. Text can be data in the form of words or alphabetic characters.

Figure 5:
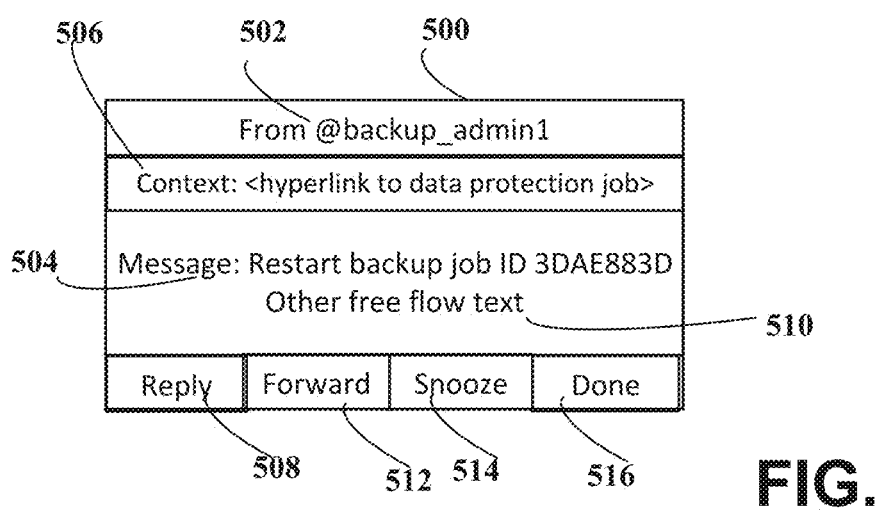
FIG. 5 illustrates a block diagram of an example received message for a natural language processor communicating and taking action based on contexts for messages between users in copy management systems, under an embodiment.
Figure 6:
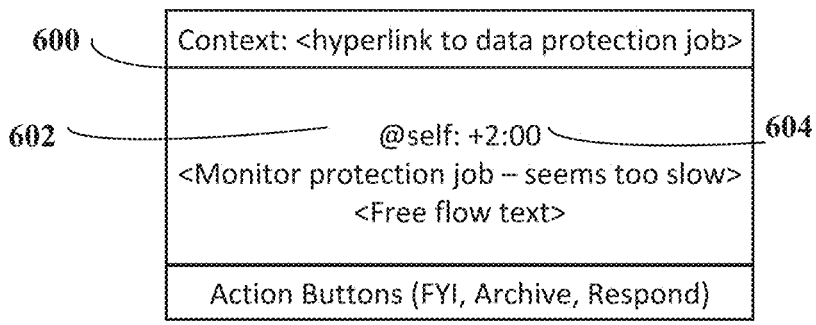
FIG. 6 illustrates a block diagram of an example self-directed message for a natural language processor communicating and taking action based on contexts for messages between users in copy management systems, under an embodiment.

The copy management system also stores the time 09:00 A.M. 406 when Amy specified that her subsequent messages 400 and 500 will be made available for Bob as at least one of the intended recipients, as depicted by FIG. 4, and FIG. 5, which provides Bob with sufficient time to respond for the in-progress job and the failed job before his shift changes. The copy management system additionally stores Amy's free format text for her first message, which specifies "Monitor backup job ID 5DCF71D7" 408, which may be followed by any other free flow text 410, as depicted by FIG. 4, and which refers to the job ID 5DCF71D7 that is depicted in the context of the row 302 in the protection jobs report 300. The copy management system also stores Amy's free format text for her second message, which specifies "Restart backup job ID 3DAE883D" 504, which may be followed by any other free flow text 510, as depicted by FIG. 5, and which refers to the Job ID 3DAE883D that is depicted in the context of the row 304 in the protection jobs report 300.

The natural language processing engine can work in the context of what normally gets communicated between the administrators of a copy management system. The scope for this context is quite limited and hence a very fine and very accurate natural language processing engine is possible with very low computing overhead. The natural language processing engine can analyze secure messages, "interpret" the requests between users, and take appropriate actions. For example, if a system user enters "@", the system selects the most relevant user for the present context. This interpretation, which is near real time, is like Active Natural Language Processing and context-based suggestions.

The copy management system securely communicates desired human actions about copy management activities within the copy management system and user interface while freely utilizing natural language-based tags. Although the preceding examples describe a backup administrator Amy tagging another backup administrator Bob as the intended recipient(s) of her subsequent messages, any system user may tag any number and any type of individual system users and/or groups of system users as the intended recipient(s) of the system user's subsequent message(s). A natural language processing engine can assist a system user in tagging other users by suggesting auto-complete options of tags that identify authorized users of the copy management system, or the other authorized users whom the system user has a history for sending a context message, rather than suggesting auto-complete options of tags for every person listed in the system user's contact list. A copy management system can enable the tagging of any copy management activity, such as backup, restore, or discovery. The end use case for this tagging may be for the backup administrators to communicate amongst themselves, or as reminders for themselves.

Storing user entries for a message may include using a natural language processing engine to process and store the user entries for the message. For example, the copy management system enables a natural language processing engine to process the message "@backup_admin1: +3 h" as equivalent to "@backup_admin1: +3:00" or "@backup_admin1: 12:00," all of which specify that the first backup administrator will receive a message in three hours, which will be noon for a message that was created at 9:00 A.M. In another example, the natural language processing engine interprets remind "@user1+3:00<message>" as send the message to user1 3 hours from now, "+3" or + "3 h" can mean the same, but "3" can mean nearest 3:00 as in either 3:00 P.M. or 3:00 A.M. Additionally, "3" may have a special meaning in the sense that if the user1 is working at 3:00 A.M., then it is 3:00 A.M., else it is 3:00 P.M. Additionally, Sunday can mean the start of the user1 shift on Sunday or +1 Sunday can mean 1 hour after the start of the shift for user1 on Sunday.

The natural language processing engine can also expand a message when required. For example, the natural language processing engine will replace "me," in the message "@JKL: call me when you begin to monitor," with the contact details of the text message's originator. In another example, four hours after a message is created for an intended recipient of the message, the natural language processing engine will replace "DELL Support" in the message "@xyz: +4 H call DELL Support," with the Dell support information. Natural language processing can be computer analysis and understanding of written human communications.

The natural language processing engine can parse a message as it is typed and display the detailed message in another window where the user can make corrections. Alternatively, the natural language processing engine can parse a message when a user selects to send the message, such that the detailed message is then displayed and enabled to be corrected and/or confirmed. Beyond the previous examples, natural language processing is not limited to just the parsing of time and activation of triggers.

Natural language processing can attempt to autofill the initial message based on the context that is getting captured and the prior messages between users for similar contexts. A natural language processing engine will attempt to interpret the free form text message and display the interpreted message as a much more human readable message, which the recipient will see as if the message-creating user entered a fully detailed message. The natural language processing engine will make the substitutions and enhancements when certain keywords are entered in either part of a message, such as "Call Support" will automatically become Call Dell Support at 1-800 123 4567. The natural language processing engine can generate role-based actions. For example, the natural language processing engine interprets "Escalate@supervisor <message>" to send a message to the supervisor of the user who is generating the message or the user who is the intended recipient of the message, depending on how the users are referenced.

A snapshot may include an active hyperlink to copy management content, which corresponds to an active hyperlink in the selected part of the copy management content. Therefore, if the selected part of the copy management content includes any hyperlinks to additional copy management content, then selecting a hyperlink to the part of the copy management content also enables the selection of any hyperlinks in the part of the copy management content to additional copy management content. For example, the copy management system creates a modal window that includes a hyperlink to the live snapshot of the part of the copy management content which the user interface displayed and the message-creating user can review by clicking on the hyperlink to the context 402 for the message 400, as depicted by FIG. 4, or by clicking on the hyperlink to the context 506 for the message 500, as depicted by FIG. 5.

The part of the copy management content which the user selected as the context can be reviewed by clicking on the hyperlink to the context 402 for the message 400, as depicted by FIG. 4, or by clicking on the hyperlink to the context 506 for the message 504, as depicted by FIG. 5. Similar to the row 304, the row 302 of information for job ID 5DCF71D7 in the protection jobs report 300 includes active hyperlinks to the job ID, the status, the description, the policy name, the assets, and the job type for job ID 5DCF71D7. Therefore, when the intended recipient(s) of the message selects the hyperlink to the context 402 in the copy management system, the intended recipient(s) may also review additional information about the job ID 5DCF71D7 by selecting any of the hyperlinks to the job ID, the status, the description, the policy name, the assets, and the job type for job ID 5DCF71D7. An active hyperlink can be a digital reference to a computer's information that is functioning to enable a user to follow or be guided to by clicking or tapping.

Having stored a user's entries as text in a message, the copy management system can enable the addition of at least one response button option in the message, block 210. The system can suggest for a user who is creating a message to consider the addition of response button options that are similar to response button options that were added to previous similar messages. For example, and without limitation, this can include the copy management system using the natural language processing engine to parse the draft of Amy's text message 408 and then propose adding a group of action buttons 412 which correspond to preset responses to the draft of Amy's message 408 which Bob the intended recipient can select to reply to Amy's message 408, as depicted by FIG. 4.

A copy management system can include a few response button options, such as send and reply, and some response button options which characterize the importance of the message itself. The natural language processing engine parses a message and proposes the creation of appropriate events for specific backup administrators. The response button options are very context specific. A message which needs a specific action can require a user to select a "Done" button to dismiss the message. Other messages which are only informational, may just require adding an FYI button 414 for the sending user to include, and/or an "acknowledge" button for the message recipient to select as a confirmation reply.

For this example, a natural language processing engine analyzes the text of Amy's message, "Monitor backup job ID 5DCF71D7" 408, identifies the text of previous messages which were similar to Amy's current text, and identifies the response button options that the previous users added as response button options to the previous similar text messages. Then the natural language processing engine proposes that Amy add the similar response button options, such as buttons for "FYI" 414 (for your information), "Archive" 416, and "Respond" 418 to her message 408, as depicted by FIG. 4. Alternatively, the natural language processing engine adds these response button options 414-418 to Amy's draft of the current text message 408, and then provides the opportunity for Amy to approve or delete each of the proposed added action button options 412, as depicted by FIG. 4. A response button option can be a graphical control element that provides a user with a simple way to choose a written answer.

After storing the time when a message is available for an intended recipient(s), the message is sent at the user-specified time to the intended recipient(s) via an internal communication channel of the copy management system, block 212. The system sends the user's message internally to its intended recipient(s) at the time when the user's message is specified as available. By way of example and without limitation, this can include the copy management system sending, at 9:00 A.M. 406, Amy's message 500 from "@backup_admin1" 502 to Bob, which specifies "Restart this backup job ID 3DAE883D" 504 and which provides the hyperlink to the context 506 for this received message 500, as depicted by FIG. 5, by including a hyperlink to the live snapshot of the row 302 that depicts information about job ID 3DAE83D as a failed job. Although this example describes the intended recipient(s) receiving the context message only at a time specified by the system user who created the context message, the intended recipient(s) can review a list of all the messages that the intended recipient is scheduled to subsequently receive in order to plan the intended recipient's work in advance. An internal communication channel can be the medium used to transport information within a network from one network device to another network device.

If an intended recipient(s) of a message is not logged into the copy management system at the time the message arrives, the message will pop up when an intended recipient(s) logs in. If the intended recipient(s) does not pick up the message, whenever the user who created the message logs in (after a timer expires), the message may be sent back to the user who created the message. A "pop-up" is used as an example of a user interface method which alerts the intended recipient(s) about an intended message, such as alerting Bob about his upcoming message from Amy, which is waiting to be delivered at the scheduled time. The copy management system does not have to use a pop-up browser message, and can use other forms of messages.

In an example, a message becomes a reminder for a backup administrator at the specified time. At 09:00 A.M., Bob the backup administrator of Acme's second shift receives a pop-up message, and then selects to reply 508 or forward 512 this message to the appropriate individuals or groups, snooze 514 this received message 500 for a certain amount of time, or select to be "done" 516 with the received message 500, as depicted by FIG. 5. As an alternative example, the message 600 can be for oneself, when the copy management system indicates that the tag "@self" 602 is meant for the message-originating user who is logged in, and the "+2:00" 604 implies a reminder to self to monitor a certain operation with the captured context and at a time that is exactly 2 hours from now.

Figure 7:
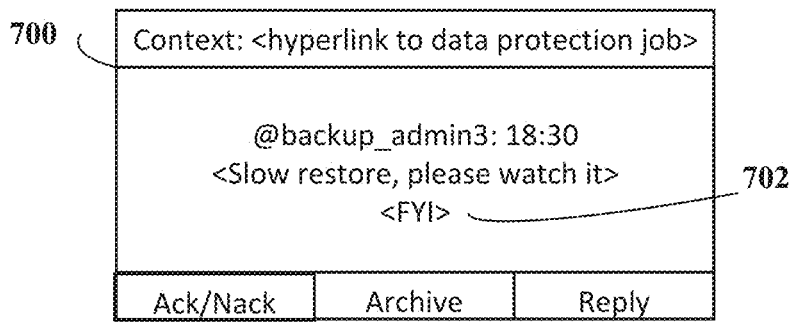
FIG. 7 illustrates a block diagram of an example informational message for a natural language processor communicating and taking action based on contexts for messages between users in copy management systems, under an embodiment.

The natural language processing engine has the intelligence to filter out keywords. For example: if a message 700 includes the user's text "FYI" 702, the natural language processing engine understands that the user who created this message intended for the recipient to receive the message "for your information," instead or for requiring a detailed response, and therefore reduces the priority of the message, as depicted by FIG. 7. Another example of a message which is for informational purposes only is "@backup_admin1: 2:00 throttling load due to disk rebuild on storage device #3. [FYI only]," while an example of a message that requires a specific response is "@backup_admin2: +3:00 [disks arriving, check and hot swap and void the throttle]."

Figure 8:
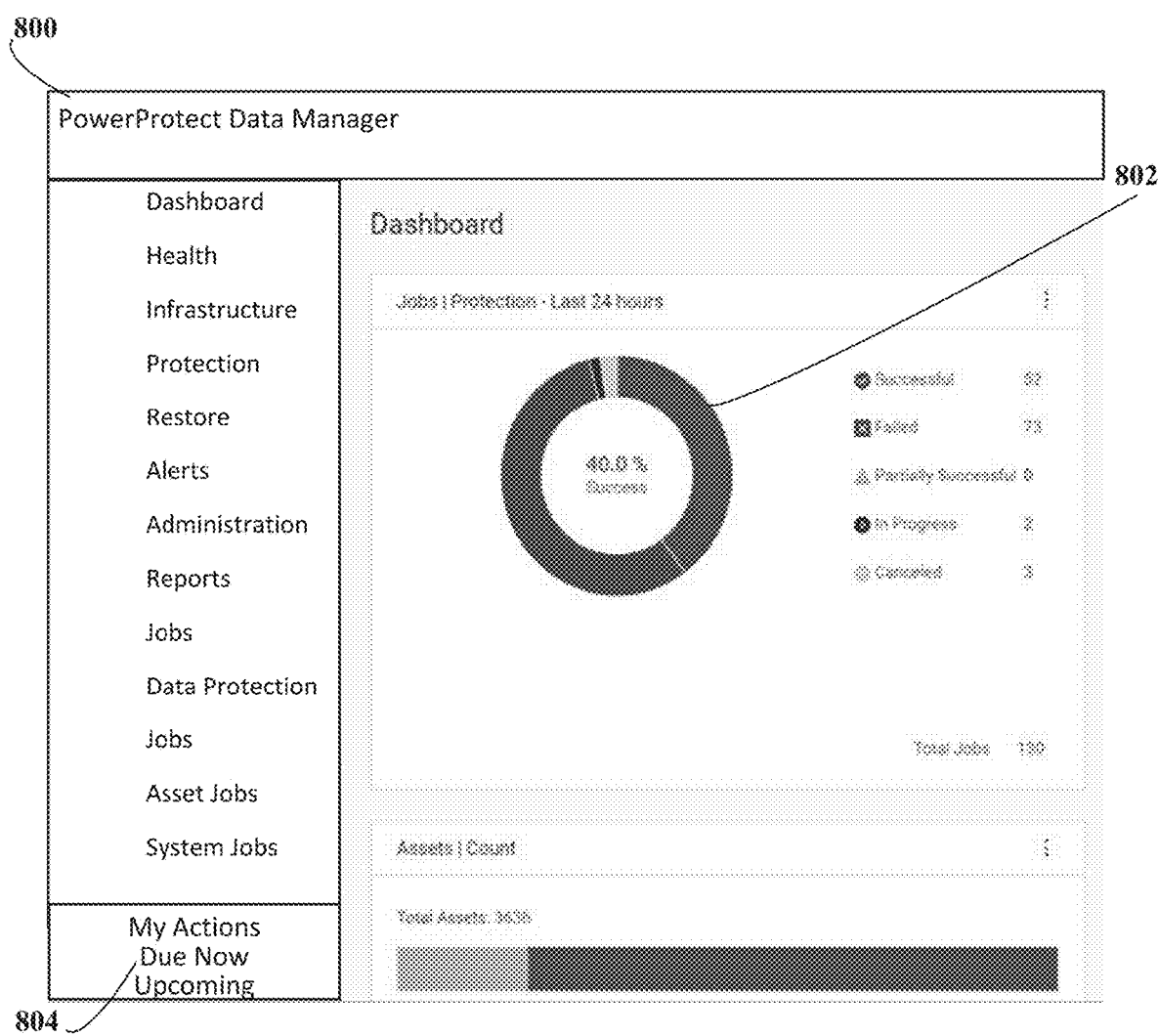
FIG. 8 illustrates a block diagram of an example dashboard for protection jobs for a natural language processor communicating and taking action based on contexts for messages between users in copy management systems, under an embodiment.

Although the previous examples of the copy management content are based on a protection jobs report 300, any other part of copy management content may be selected as the content for a user's message. For example, a user can select protection jobs information 802 from a dashboard for protection jobs 800 as the basis of the context for a user's message, as depicted in FIG. 8. A user can review their queue and see all upcoming messages and messages that have already hit their intended time via user interfaces which are dedicated to displaying such content and many associated details. Additionally, the user may also have access to review their queue and see all upcoming messages and messages that have already hit their intended time via selecting buttons from other user interfaces which focus on other information, such as the actions due now/upcoming button 804 on the dashboard for protection jobs 800.

After sending the message at the specified time to the intended recipient(s) via an internal communication channel of the copy management system, a selection is received of an hyperlink to the live snapshot in the message by the at least one intended recipient of the message. Then the context for the message is output to a user interface associated with the intended recipient(s), and the context for the message enables the intended recipient(s) to respond to the message, block 214. The system provides the system user's selected context to messages sent to intended recipients. In embodiments, this can include the copy management system responding to Bob's selection of the hyperlink to the context 506 in Amy's message 504 about restarting a backup job by displaying the live snapshot, which depicts information in the row 304 about the failed job ID 3DAE83D as the context for Amy's message 500, to Bob's user interface, as depicted by FIG. 5. This specific hyperlink to the context 506 enables Bob the second shift's backup administrator to fully understand Amy's message 500 and use the necessary precautions when restarting the failed job, which results in Bob selecting to reply 508, as depicted by FIG. 5, with a message informing Amy of the success for job ID 3DAE83D.

Although this example describes the at least one intended recipient of a context message replying by selecting one of the preset response options and adding a simple message to the system user who created the context message, the intended recipient(s) can respond to the context message by creating an additional context message that enables a subsequent recipient of the additional context message to respond to the additional context message. For example, Bob the second shift's backup administrator encounters a different problem in restarting the job ID 3DAE83D than Amy the first shift's backup administrator encountered with the job ID 3DAE83D, so Bob creates a new context message and tags the new context message "@backup_admin3" to send the new context message to Chris, the third shift's backup administrator. When Chris receives the new context message, Chris also receives the original content message from Amy, and uses these cumulative context messages to determine the correct action to take in response. A selection can be the action of carefully choosing something as being the most suitable. A hyperlink can be a digital reference to a computer's information that a user can follow or be guided to by clicking or tapping.

Sending a text message at the user-selected time to the intended recipient(s) via the internal communication channel of the copy management system may include also sending any number of audio and/or video messages to the intended recipient(s). The copy management system can supplement a copy management's text message with any number of audio and/or video messages. In that situation, the user's received message will also include a play button to play the audio and/or video message(s). The copy management system can include a speech to text library which can be used to annotate the audio message(s). The audio messages can be converted to text and/or interpreted by a natural language processing engine, which can enable the intended recipient of the message to take an appropriate action based on the received message. The audio and/or video message(s) can be used for archival, search, or audit purposes. An audio message can be sound transmitted by a sender to a recipient. Using natural language processing eases the burden on the senders of backup copies of digital assets, while using audio/video captured as part of this internal messaging also makes it easier for the sender and the intended recipient(s) of the backup copies of the digital assets.

Sending the message at the correct time to the intended recipient(s) via the internal communication channel of the copy management system may include the copy management system also sending a notification of the message to the intended recipient(s) via one or more external communication channels. The copy management system can select an optional connection to share a notification about the message via external tools, such as email or instant messaging while on a phone call. The natural language processing engine can transfer a message to notify of the appropriate gateway, which can be by email, instance messaging, or Short Messaging Service (SMS), etc.

A system user can opt for a supplementary external notification, such as being notified using instant messaging or email, with a delay factor. If there is a message that becomes active for an action by a system user at 9:00 AM, then that message may be shown to the system user if the system user is online at 900 AM. If the system user has opted for an external notification and a delay of 10 minutes, then the system user receives a notification of the message at 9:10 AM, indicating that there is something in the user's queue. The external notification message will not include any contextual information. The external notification settings can also be global and enforced by the company.

In response to receiving a trace request for a message, the copy management system can identify and output a history of communications associated with the message, block 216. The system can use a message's tag(s) to trace the message. For example and without limitation, this can include the copy management system responding to a request to trace Amy's message 400 by using any tags 404 in the original message 400 and any subsequent messages to record and output the history of Amy's message 400, as depicted by FIG. 4. Since the copy management system's tags have built-in tracing, the backup administrators can trace the messaging between various users such as backup administrators, and determine if a certain message was delivered to a specific user or a specific action was taken. Since the copy management system can have difficulty providing any way to trace what is being communicated externally amongst a team of backup administrators, the copy management system enables contextual communication and trace functionality that communicates internally in the copy management system.

The copy management system determines if a second, or current, context of messages between users of the copy management system matches the first, or previous context of messages between users of the copy management system, block 218. The system determines if any current conversational contexts match any previously identified conversational contexts. By way of example, and without limitation, this can include the copy management system using a natural language processing engine to determine if the current context of a series of messages between copy management system users, such as but not limited to Amy and Bob, matches any previously identified context of messages, such as content which requested a restore operation. Matching can be the identifying of a string that fulfills the specified conditions of a computer search. If a new conversational context of messages matches any previously identified conversational context of messages, the method 200 continues to block 220 to convey the information which was requested following the previous conversational context of messages. If the new conversational context of messages does not match any previously identified conversational context of messages, the method 200 continues to block 222 to determine whether to execute a query on a context.

If the second, or current, context of messages between users of the copy management system matches the first, or previous, context of messages between users of the copy management system, then a copy management system conveys, to at least one user interface, information requested in a message subsequent to the first context of messages between users of the copy management system, block 220. The system auto prompts a previous request for additional context information upon determining that the current context matches a previous context which was subsequently followed by a previous request for additional context information. In embodiments, this can include a copy management system's machine-learning system auto-generating a request for clarification of a lab location where a file will be restored and a request for clarification of credentials required to access the file, and conveying these automatically generated requests to Amy the Acme Corporation backup administrator who is currently requesting for Bob, another Acme Corporation backup administrator, to restore a file. The machine-learning system automatically generates these clarification requests because the machine-learning system learned that these clarification requests inevitably followed the previous conversational context created by a series of messages between Dana and Ed which created the content that included Dana requesting a file to be restored. However, rather than waiting for the current users Amy and Bob to send multiple messages back and forth and eventually request these inevitably required clarifications, the machine-learning system optimizes the messages exchanged between users by prompting Amy, who is requesting the restore of a backup file, to convey the anticipated clarifications that Bob will likely request.

The machine-learning system can also enable the copy management system to function as one of the intended recipients of a system message, by creating a virtual assistant for tasks which can be delegated to non-humans. This implies that the copy management system extends from the interactions between users, to where there are interactions between the users and the system. As an example, rather than requesting another administrator to monitor a backup job, the administrator Amy may request the virtual assistant to monitor a backup job and alert her when the backup job is completed, or when the backup job has reached a 50% completion threshold.

As an extension, the virtual assistant can intercede as an assistant to system users. If a first administrator sends a message that requests a second administrator to perform an action, and a virtual assistant can determine that the requested action has already been performed before the second administrator even receives the message, the virtual assistant can indicate that the action has already been performed, and/or automatically acknowledge the message that requested the action. For example, if Amy sends a message to Bob that requests Bob to monitor a backup job that is executing slowly, and the virtual assistant determines that the backup job is already completed before Bob starts his shift, the virtual assistant can acknowledge the message from Amy to Bob, and inform Amy that the backup job is completed, such that the copy management system does not have to deliver the message requesting the monitoring of the backup job to Bob.

The natural language processing engine can interpret a message that a copy management system user is currently creating or has recently created based on the current context for the user, the previous contexts for the current users, and/or the previous contexts for other users. The natural language processing engine can use these and other factors, along with the history of user responses, to auto-tune messages while the messages are being created and/or shortly after they have been created. For example, Amy clicks on a context that is displayed on her user interface, then enters the characters "@B: Monitor; Slow." The natural language processing engine interprets that "@B" implies that the current message is for Bob the backup administrator, Amy's click on the displayed "Job 2048" is a reference to the SQL backup file that the job 2048 is creating from the Host H, and the words "Monitor; Slow," are a request to monitor the job 2048, and a comment that the job 2048 is executing slower than expected. Collectively, the natural language processing engine interprets Amy's entries and her click as a message that Bob receives as "Please monitor the SQL backup from the Host H (job 2048). It appears to be running slowly."

When Bob responds to Amy's message, he enters "Restore?" The natural language processing engine interprets that the job 2048 creating a SQL backup file from the Host H, as referenced in Amy's message, is the implied context for Bob's query, and since Bob's question about executing a restore operation applies only to the Host H from this implied context, the copy management system queries the Host H for a restore operation, identifies that the Host H is currently executing a DB723 restore operation, and outputs the result of Bob's query as a response to Amy's message, in which Bob's message explains that the Host H is executing more slowly than expected due to the current execution of the DB723 restore operation.

In another example, Amy clicks on a context that is displayed on her user interface, then enters the characters "@B: Monitor; Slow; Finish." The natural language processing engine interprets that "@B" implies that the current message is for Bob the backup administrator, Amy's click on the displayed "Job 2089" is a reference to the SQL backup file that the job 2089 is creating from the Host A, and the words "Monitor; Slow; Finish," are a request to monitor the job 2089, a comment that the job 2089 is executing slower than expected, and a request to verify that the job 2089 finishes execution during Bob's shift. Collectively, the natural language processing engine interprets Amy's entries and her click as a message that Bob receives as "I observed the job 2089 (a SQL backup from the Host A) is executing slower than expected. Can you please verify that the job 2089 completes its execution during your shift?"

When Bob logs in to the copy management system, the natural language processing engine interprets that the job 2089 creating a SQL backup file from the Host A is the implied context from Amy's message for Bob's implied query for his response to Amy's message. Therefore, when Bob sees Amy's message, he can also see the following results of the copy management system's query of the implied context, as hints for creating his response: "The job 2089 is now at 73% completion, and the estimated time of completion is 1:50 P.M.," and "The job 2089 is targeted towards deduplicating the storage B, and the storage B is executing garbage collection today." Bob can select any of these hints as the basis for his initial response, or the natural language processing engine can enable Bob to respond to Amy's message based on his implied query of the implied context in Amy's message as follows, "Restore ongoing" and "The Host A has a DB724 restore operation executing," such that when Amy sees Bob's initial response later, the natural language processing engine can also query the Host A and the job 2089 and supplement Bob's initial response with the additional context information "The job 2089 completed its execution at 2:15 P.M. The Host A had DB724 restored today, and the restore job executed for 11 hours."

In response to an implied or an explicit selection of a context, the system queries the selected context and outputs a result of the query to at least one user interface, block 222. The system executes queries on implied and explicitly selected contexts, and outputs the query results. For example and without limitation, this can include the natural language processing engine responding to Amy's click on the displayed "Job 2048" as a selection to query the context of the job 2048, and replying with the query result which describes that the job 2048 is creating a SQL backup file from the Host H. In another example, the natural language processing engine responds to the Host H as the implied context for Bob's query, and outputs the query results that explain the Host H is executing more slowly than expected due to the current execution of the DB723 restore operation. In yet another example, the natural language processing engine responds to Amy's click on the displayed "Job 2089" as a selection to query the context of the job 2089, and replies with the query result which describes that the job 2089 is creating a SQL backup file from the Host A.

In an additional example, the natural language processing engine responds to Bob's implied query of Bob's implied context of the job 2089 creating a SQL backup file from the Host A, and outputs the following query results as hints for creating his response: "The job 2089 is now at 73% completion, and the estimated time of completion is 1:50 P.M.," and "The job 2089 is targeted towards deduplicating the storage B, and the storage B is executing garbage collection today." In a further example, the natural language processing engine responds to Bob's initial reply about the Host A and the job 2089 as the implied context for Bob's implied query, and supplemented Bob's initial reply with the additional queried context information "The job 2089 completed its execution at 2:15 P.M. The Host A had DB724 restored today, and the restore job executed for 11 hours."

Although FIG. 2 depicts the blocks 202-222 occurring in a specific order, the blocks 202-222 may occur in another order. In other implementations, each of the blocks 202-222 may also be executed in combination with other blocks and/or some blocks may be divided into a different set of blocks.

Since the copy management system uses tags to send a user's message only to the user's intended recipient(s), and returns the message to the user if no intended recipient receives the message within a specified time, the copy management system will not lose any messages. The copy management system may store critical data, such as a fully qualified domain name/internet protocol address of a server storing financial records, but an enterprise may not want such data to be conveyed via instant messaging or email, so all of this critical data remains secure within the copy management system's internal communication channels. A user securely communicates desired human actions about the copy management content within a copy management system's user interface and application. Advantages of communicating internally within the copy management system includes the context awareness of each communication, the inherited robust security of the copy management system's user interface, and the continuity in the users' workflow, as the backup administrators can communicate amongst themselves without pausing to externally communicate using any cut or paste options.

The main problem is resolved by opting for "all internal communications" which provides full auditing and security as nothing moves out of the copy management system 100. The copy management application-driven "live snapshot" assists with the capture and the recipient's ability to see exactly the same content as the sender. Any external application will not be able to understand the full context and their snapshots are just a point-in-time static image captures.

Although the following paragraphs describe Dell Corporation's PowerProtect® backup/restore application, Dell Corporation's NetWorker® backup/restore application, and Dell Corporation's Avamar® backup/restore application as examples of the backup/restore application 102, the backup/restore application 102 may be another type of backup/restore application which provides the backup/restore functionalities described in the Background section. A backup server may be another type of backup server which provides the backup/restore functionalities described in the Background section.

The backup/restore application 102 may be a Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances.

When superior performance is crucial, PowerProtect® Data Manager provides a direct path between Dell tier one storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 102 may be a Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups.

The core NetWorker® software backs up client file systems and operating system environments. Add-on database and application modules provide backup services for products such as Microsoft® Exchange Server. Client backup data may be sent to a remote NetWorker® storage node or stored on a locally attached device using a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 102 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic.

Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility. Periodic checks of data systems ensure recoverability whenever needed. Dell Corporation's Avamar® systems may be deployed in an integrated solution with Dell Corporation's Data Domain® systems for high-speed backup and recovery of specific data types.

The backup/restore application 102 may use different policies for various data protection levels, such as a "gold" policy for VMware® clients, a "platinum" policy for UNIX® clients, and a "silver" policy for Windows® clients. The gold policy can specify to store two backup copies for each VMware® client's application resources onto the first disk for six months, store a primary clone of the backup copies onto the second disk for one year, and store a secondary clone of the backup copies onto a tape for five years. In another example, a policy can provide redundancy by specifying to replicate each full backup copy to three different backups servers, replicate each incremental cumulative backup copy and each incremental differential backup copy to two different backup servers, replicate each archive log backup copy to an additional backup server, and relocate each full backup copy created at the end of the month to cloud tiering for long term retention. Backup copies stored in the cloud tiering have higher costs associated with storing and accessing the data in the backup copies. A policy's start time can specify the start times for creating a backup copy of an application resource, such as 12:00, 13:00, 14:00, and 15:00, for an hourly backup copy, a policy's retention policy can specify the length of time that a backup copy is retained before the backup copy is destroyed, such as a week, a month, or a year, and a policy's destination pool can include the target storage device where backup copies are stored.

Figure 9:
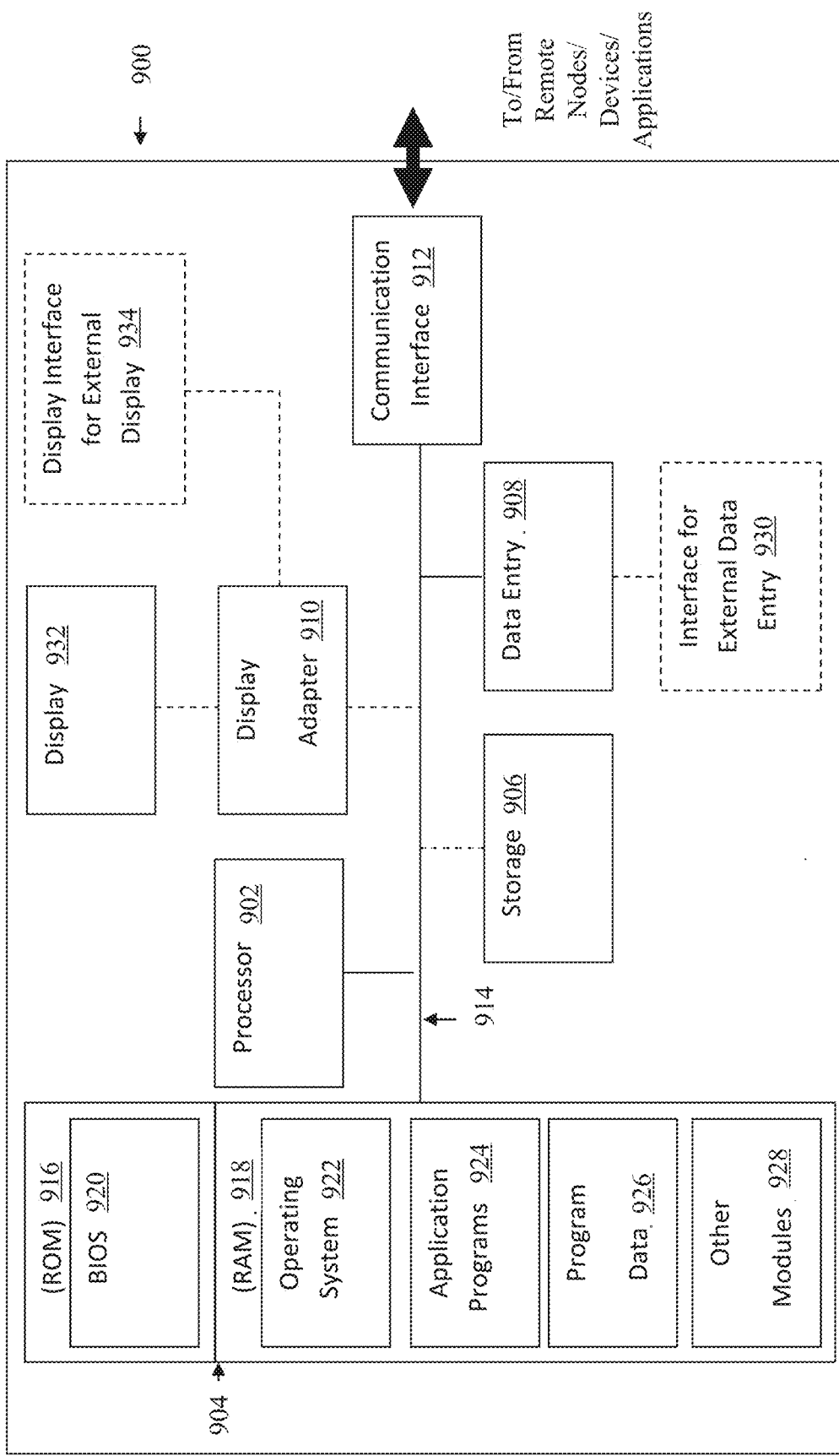
FIG. 9 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 9 may vary depending on the system implementation. With reference to FIG. 9, an exemplary system for implementing the subject matter disclosed herein includes a hardware device 900, including a processing unit 902, memory 904, storage 906, a data entry module 908, a display adapter 910, a communication interface 912, and a bus 914 that couples the elements 904-912 to the processing unit 902.

The bus 914 may comprise any type of bus architecture. Examples include a memory bus, a peripheral bus, a local bus, etc. The processing unit 902 is an instruction execution machine, apparatus, or device and may comprise a microprocessor, a digital signal processor, a graphics processing unit, an application specific integrated circuit (ASIC), a field programmable gate array (FPGA), etc. The processing unit 902 may be configured to execute program instructions stored in the memory 904 and/or the storage 906 and/or received via the data entry module 908.

The memory 904 may include read only memory (ROM) 916 and random-access memory (RAM) 918. The memory 904 may be configured to store program instructions and data during operation of the hardware device 900. In various embodiments, the memory 904 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 904 may also include nonvolatile memory technologies such as nonvolatile flash RAM (NVRAM) or ROM. In some embodiments, it is contemplated that the memory 904 may include a combination of technologies such as the foregoing, as well as other technologies not specifically mentioned. When the subject matter is implemented in a computer system, a basic input/output system (BIOS) 920, containing the basic routines that help to transfer information between elements within the computer system, such as during start-up, is stored in the ROM 916.

The storage 906 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 900. It is noted that the methods described herein may be embodied in executable instructions stored in a computer readable medium for use by or in connection with an instruction execution machine, apparatus, or device, such as a computer-based or processor-containing machine, apparatus, or device.

It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for conducting the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 906, the ROM 916 or the RAM 918, including an operating system 922, one or more applications programs 924, program data 926, and other program modules 928. A user may enter commands and information into the hardware device 900 through the data entry module 908. The data entry module 908 may include mechanisms such as a keyboard, a touch screen, a pointing device, etc. Other external input devices (not shown) are connected to the hardware device 900 via an external data entry interface 930.

By way of example and not limitation, external input devices may include a microphone, joystick, game pad, satellite dish, scanner, or the like. In some embodiments, external input devices may include video or audio input devices such as a video camera, a still camera, etc. The data entry module 908 may be configured to receive input from one or more users of the hardware device 900 and to deliver such input to the processing unit 902 and/or the memory 904 via the bus 914.

A display 932 is also connected to the bus 914 via the display adapter 910. The display 932 may be configured to display output of the hardware device 900 to one or more users. In some embodiments, a given device such as a touch screen, for example, may function as both the data entry module 908 and the display 932. External display devices may also be connected to the bus 914 via an external display interface 934. Other peripheral output devices, not shown, such as speakers and printers, may be connected to the hardware device 900.

The hardware device 900 may operate in a networked environment using logical connections to one or more remote nodes (not shown) via the communication interface 912. The remote node may be another computer, a server, a router, a peer device, or other common network node, and typically includes many or all the elements described above relative to the hardware device 900. The communication interface 912 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 912 may include logic configured to support direct memory access (DMA) transfers between the memory 904 and other devices.

In a networked environment, program modules depicted relative to the hardware device 900, or portions thereof, may be stored in a remote storage device, such as, for example, on a server. It will be appreciated that other hardware and/or software to establish communications between the hardware device 900 and other devices may be used.

The arrangement of the hardware device 900 illustrated in FIG. 9 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 900.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 9.

Other components may be implemented in software, hardware, or a combination of software and hardware. Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it.

The computer, which reconfigures or otherwise alters the operation of the device in a manner well understood by those skilled in the art. The data structures where data is maintained are physical locations of the memory that have properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for communicating and taking action based on contexts for messages between users in copy management systems, comprising:
    one or more processors; and
    a non-transitory computer readable medium storing a plurality of instructions, which when executed, cause the one or more processors to:
        determine a first context of messages between users of a copy management system;
        create a snapshot of a part of copy management content which is displayed by a user interface, and which is selected by a user of the copy management system as context for a message from the user;
        create a hyperlink in the message to the snapshot which depicts the part of the copy management content;
        store user entries for a tag that identifies at least one intended recipient of the message, a time when the message is made available for the at least one intended recipient, and text for the message;
        send the message at the time to the at least one intended recipient via an internal communication channel of the copy management system;
        output the context for the message to at least one user interface associated with the at least one intended recipient, in response to a selection of a hyperlink for the snapshot in the message by the at least one intended recipient of the message, wherein the context for the message enables at least one intended recipient to respond to the message;
        determine if a second context of messages between users of the copy management system matches the first context of messages; and
        convey, to at least one user interface, information requested in a message subsequent to the first context of messages, in response to a determination that the second context of messages matches the first context of messages.

2. The system of claim 1, wherein the copy management system functions as a virtual assistant for at least one of the user and the at least one intended recipient.

3. The system of claim 1, wherein the plurality of instructions further causes the processor to respond to one of an implied or an explicit selection of a context by querying the selected context and outputting a result of the query to at least one user interface.

4. The system of claim 1, wherein the plurality of instructions further causes the processor to add at least one response button option in the message.

5. The system of claim 1, wherein the snapshot includes the active hyperlink to the part of the copy management content, and any active hyperlinks within the part of the copy management content, and selecting the active hyperlink in the snapshot to the part of the copy management content enables a selection of any active hyperlinks within the part of the copy management content to additional copy management content.

6. The system of claim 1, wherein sending the message to at least one intended recipient via the internal communication channel of the copy management system further comprises the copy management system executing at least one of 1) sending a notification of the message to the at least one intended recipient via one or more external communication channels, or 2) sending at least one audio file to the at least one intended recipient via an internal communication channel.

7. The system of claim 1, wherein the plurality of instructions further causes the processor to identify and output a history of communications associated with the message in response to receiving a trace request for the message.

8. A computer-implemented method for communicating and taking action based on contexts for messages between users in copy management systems, the computer-implemented method comprising:
    determining a first context of messages between users of a copy management system;
    creating a snapshot of a part of copy management content which is displayed by a user interface, and which is selected by a user of a copy management system as context for a message from the user;
    creating a hyperlink in the message to the snapshot which depicts the part of the copy management content;
    storing user entries for a tag that identifies at least one intended recipient of the message, a time when the message is made available for the at least one intended recipient, and text for the message;
    sending the message at the time to the at least one intended recipient via an internal communication channel of the copy management system;
    outputting the context for the message to at least one user interface associated with the at least one intended recipient, in response to a selection of a hyperlink for the snapshot in the message by the at least one intended recipient of the message, wherein the context for the message enables the at least one intended recipient to respond to the message;
    determining if a second context of messages between users of the copy management system matches the first context of messages; and
    conveying, to at least one user interface, information requested in a message subsequent to the first context of messages, in response to a determination that the second context of messages matches the first context of messages.

9. The computer-implemented method of claim 8, wherein the copy management system functions as a virtual assistant for at least one of the user and the at least one intended recipient.

10. The computer-implemented method of claim 9, wherein the computer-implemented method further comprises responding to one of an implied or an explicit selection of a context by querying the selected context and outputting a result of the query to at least one user interface.

11. The computer-implemented method of claim 8, wherein the computer-implemented method further comprises adding at least one response button option in the message.

12. The computer-implemented method of claim 8, wherein the snapshot includes the active hyperlink to the part of the copy management content, and any active hyperlinks within the part of the copy management content, and selecting the active hyperlink in the snapshot to the part of the copy management content enables a selection of any active hyperlinks within the part of the copy management content to additional copy management content.

13. The computer-implemented method of claim 8, wherein sending the message to the at least one intended recipient via the internal communication channel of the copy management system further comprises the copy management system executing at least one of 1) sending a notification of the message to the at least one intended recipient via one or more external communication channels, or 2) sending at least one audio file to the at least one intended recipient via an internal communication channel.

14. The computer-implemented method of claim 8, wherein the computer-implemented method further comprises identifying and outputting a history of communications associated with the message in response to receiving a trace request for the message.

15. A computer program product, comprising a non-transitory computer-readable medium having a computer-readable program code embodied therein to be executed by one or more processors, the program code including instructions to:
    determine a first context of messages between users of a copy management system;
    create a snapshot of a part of copy management content which is displayed by a user interface, and which is selected by a user of a copy management system as context for a message from the user;
    create a hyperlink in the message to the snapshot which depicts the part of the copy management content;
    store user entries for a tag that identifies at least one intended recipient of the message, a time when the message is made available for the at least one intended recipient, and text for the message;
    send the message at the time to the at least one intended recipient via an internal communication channel of the copy management system;
    output the context for the message to a user interface associated with the at least one intended recipient, in response to a selection of a hyperlink for the snapshot in the message by the at least one intended recipient of the message, wherein the context for the message enables the at least one intended recipient to respond to the message;
    determine if a second context of messages between users of the copy management system matches the first context of messages; and
    convey, to at least one user interface, information requested in a message subsequent to the first context of messages, in response to a determination that the second context of messages matches the first context of messages.

16. The computer program product of claim 15, wherein the copy management system functions as a virtual assistant for at least one of the user and the at least one intended recipient.

17. The computer program product of claim 16, wherein the plurality of instructions further causes the processor to respond to one of an implied or an explicit selection of a context by querying the selected context and outputting a result of the query to at least one user interface.

18. The computer program product of claim 15, wherein the plurality of instructions further causes the processor to at least one of add at least one response button option in the message, and identify and output a history of communications associated with the message in response to receiving a trace request for the message.

19. The computer program product of claim 15, wherein the snapshot includes the active hyperlink to the part of the copy management content, and any active hyperlinks within the part of the copy management content, and selecting the active hyperlink in the snapshot to the part of the copy management content enables a selection of any active hyperlinks within the part of the copy management content to additional copy management content.

20. The computer program product of claim 15, wherein sending the message to the at least one intended recipient via the internal communication channel of the copy management system further comprises the copy management system executing at least one of 1) sending a notification of the message to the at least one intended recipient via one or more external communication channels, or 2) sending at least one audio file to the at least one intended recipient via an internal communication channel.

\* \* \* \* \*